United States Patent
Machiraju et al.

(10) Patent No.: US 8,442,527 B1
(45) Date of Patent: May 14, 2013

(54) CELLULAR AUTHENTICATION FOR AUTHENTICATION TO A SERVICE

(75) Inventors: Sridhar Machiraju, Burlingame, CA (US); Francis A. Hsu, Davis, CA (US); Hao Chen, Kensington, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1044 days.

(21) Appl. No.: 12/358,324

(22) Filed: Jan. 23, 2009

(51) Int. Cl.
*H04W 4/00* (2009.01)
*G06F 15/16* (2006.01)
*G06F 21/00* (2006.01)
*G06F 7/04* (2006.01)
*H04K 1/00* (2006.01)

(52) U.S. Cl.
USPC ........ 455/435.1; 709/229; 713/182; 713/184; 726/2; 380/270

(58) Field of Classification Search .................... 713/182
See application file for complete search history.

(56) References Cited

U.S. PATENT DOCUMENTS

| | | | |
|---|---|---|---|
| 6,061,346 A | 5/2000 | Nordman | |
| 6,151,628 A | 11/2000 | Xu et al. | |
| 6,230,002 B1 | 5/2001 | Floden et al. | |
| 6,865,680 B1 * | 3/2005 | Wu et al. | 726/12 |
| 6,993,658 B1 | 1/2006 | Engberg et al. | |
| 7,565,547 B2 * | 7/2009 | Matta et al. | 713/182 |
| 2005/0198534 A1 | 9/2005 | Matta et al. | |
| 2006/0206709 A1 | 9/2006 | Labrou et al. | |

* cited by examiner

*Primary Examiner* — Melody Mehrpour
*Assistant Examiner* — Natasha Cosme

(57) ABSTRACT

An identification system comprises a communication interface. The communication interface is configured to receive from a mobile device a registration request to initiate an access session between the mobile device and a communication network, wherein the registration request comprises a device identifier that identifies the mobile device. In response to the registration request, the communication interface is configured to transfer a packet address to the mobile device, wherein the mobile device transfers a service request for a service on the communication network during the access session, wherein the service request includes the packet address. The communication interface is configured to receive an identification request transferred from an authentication system in response to the service request, wherein the identification request indicates the packet address. In response to the identification request, the communication interface is configured to transfer the device identifier for delivery to the authentication system to authenticate the mobile device for the service using the device identifier.

20 Claims, 7 Drawing Sheets

CELLULAR AUTHENTICATION FOR AUTHENTICATION TO A SERVICE

TECHNICAL BACKGROUND

Many services require users to authenticate their identities prior to accessing personal information or conducting private transactions with the service. For example, a website may require users to create accounts, and the user must login to the account prior to accessing the website. The most common method used to authenticate a user to a service is a shared secret, or password, between the user and the service. The login procedure typically involves entering a username and password combination, such that the username indicates some account type with various permissions, and the password authenticates the identity of the account user.

OpenID is an exemplary authentication standard which allows users to log on to many services using a single digital identity. Since neither the OpenID protocol nor services utilizing OpenID may mandate a specific type of authentication, non-standard forms of authentication may be employed. For example, OpenID can authenticate a user with a physical token, or with biological based authentication methods, such as a fingerprint or retinal eye scan. However, these alternative methods require hardware that is not readily available for all users, so most services utilize password authentication. Unfortunately, password authentication may be insecure due to weak passwords that are easily guessed, replay attacks, and hackers.

Overview

An identification system comprises a communication interface. The communication interface is configured to receive from a mobile device a registration request to initiate an access session between the mobile device and a communication network, wherein the registration request comprises a device identifier that identifies the mobile device. In response to the registration request, the communication interface is configured to transfer a packet address to the mobile device, wherein the mobile device transfers a service request for a service on the communication network during the access session, wherein the service request includes the packet address. The communication interface is configured to receive an identification request transferred from an authentication system in response to the service request, wherein the identification request indicates the packet address. In response to the identification request, the communication interface is configured to transfer the device identifier for delivery to the authentication system to authenticate the mobile device for the service using the device identifier.

A method of operating an identification system comprises receiving from a mobile device a registration request to initiate an access session between the mobile device and a communication network, wherein the registration request comprises a device identifier that identifies the mobile device, in response to the registration request, transferring a packet address to the mobile device, wherein the mobile device transfers a service request for a service on the communication network during the access session, wherein the service request includes the packet address, receiving an identification request transferred from an authentication system in response to the service request, wherein the identification request indicates the packet address, and in response to the identification request, transferring the device identifier for delivery to the authentication system to authenticate the mobile device for the service using the device identifier.

A method of operating a communication system comprises, in a mobile device, transferring a registration request to an identification system to initiate an access session between the mobile device and a communication network, wherein the registration request comprises a device identifier that identifies the mobile device. In the identification system, in response to the registration request, transferring a packet address to the mobile device. In the mobile device, transferring a service request for a service on the communication network during the access session, wherein the service request includes the packet address. In the service, in response to the service request, transferring an authentication request for the service to the mobile device. In the mobile device, upon receiving the authentication request, transferring the service request to an authentication system, wherein the service request includes the packet address. In the authentication system, receiving the service request transferred from the mobile device, and, in response to the service request, transferring an identification request to the identification system, wherein the identification request indicates the packet address. In the identification system, receiving the identification request transferred from the authentication system, determining the device identifier associated with the packet address indicated in the identification request, and transferring the device identifier to the authentication system. In the authentication system, determining a user identifier associated with the service based on the device identifier, encrypting an authentication assertion comprising the user identifier, and transferring the authentication assertion to the mobile device. In the mobile device, receiving the authentication assertion transferred from the authentication system, and transferring the authentication assertion to the service. In the service, decrypting the authentication assertion to recover the user identifier, and verifying the user identifier to authenticate a user of the mobile device requesting the service.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
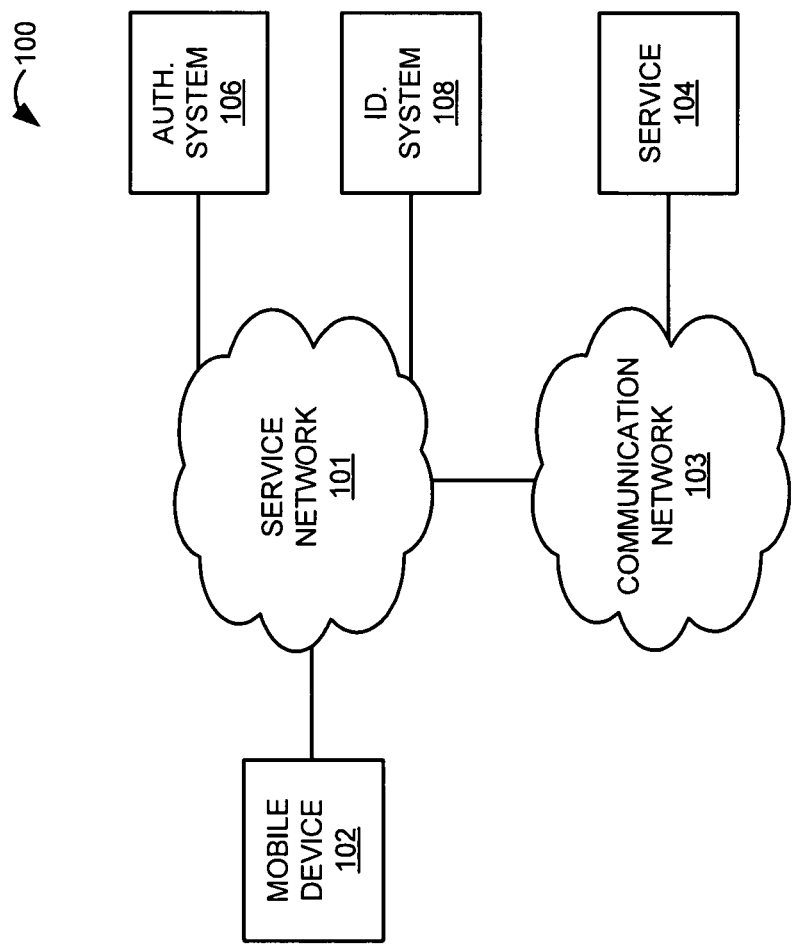
FIG. 1 is a block diagram that illustrates a communication system.

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Described herein is a method and system for authenticating a user to a service using a mobile device. Many service networks require authentication of a mobile device prior to providing a communication service. The method and system described herein utilizes this authentication process to authenticate a user of a mobile device for other services. The following four paragraphs provide a summary of one example of the present invention.

In order to request a service, a mobile device must have previously registered with its service network and obtained a packet address for data transmissions. When the mobile device registers with the network, the mobile device transfers a device identifier that identifies the mobile device to the network. After the mobile device has registered with the network, a user could request a service, such as a website, on the mobile device.

For example, the user could request a website by entering its Uniform Resource Locator (URL) into a web browser of the mobile device. At this point, instead of or in addition to requesting the user to enter a password to access the service, the website could authenticate the mobile device through the mobile device's service network. For authentication to the service, the mobile device could send its packet address to an authentication system, which is in communication with the service network. The authentication system could then forward the device's packet address to the service network. The network could determine the device identifier associated with the received packet address, and transfer the device identifier back to the authentication system.

After the authentication system receives the device identifier from the network, the authentication system could determine a user identifier associated with the device identifier. The user identifier could comprise, for example, a username or other user identifier known to the website. The authentication system could then encrypt an authentication assertion comprising the user identifier. The authentication system then sends the authentication assertion to the mobile device at the packet address specified by the mobile device in the initial request for authentication. Advantageously, sending the authentication assertion to the mobile device instead of directly to the website ensures that the mobile device provided a valid packet address. If the mobile device did not provide the packet address assigned to the mobile device, the mobile device will not receive the authentication assertion.

After the mobile device receives the authentication assertion, the mobile device forwards the authentication assertion to the website. The website can then decrypt the authentication assertion and recover the embedded user identifier. The website can then compare the user identifier to a plurality of known and previously registered user identifiers. If the decrypted user identifier matches a known user identifier registered with the website, the website can safely grant the user access to the service.

FIG. 1 illustrates communication system 100. Communication system 100 comprises service network 101, mobile device 102, communication network 103, service 104, authentication system 106, and identification system 108. Mobile device 102, authentication system 106, and identification system 108 are in communication with service network 101. Service network 101 is in communication with communication network 103. Service 104 is in communication with communication network 103. Note that, while FIG. 1 shows authentication system 106 connected to service network 101, authentication system 106 could be connected to communication network 103.

Mobile device 102 may comprise any device that has communication connectivity. Mobile device 102 comprises hardware and circuitry programmed to function as a telecommunications device. For example, mobile device 102 could comprise a telephone, transceiver, smartphone, mobile phone, cellular phone, personal digital assistant (PDA), personal communicator, handheld game console, Internet access device, personal computer (PC), Ultra-Mobile personal computer (UMPC), Worldwide Interoperability for Microwave Access (WiMAX) modem, cellular modem, handheld television, or some other apparatus with wireless communication capabilities—including combinations thereof. It should be noted that a device capable of a wired or fiber optic connection to service network 101 could also be used. For example, a broadband cable modem could provide the functionality of the mobile device in the systems and methods described herein without departing from the scope and spirit of the present invention.

Mobile device 102 is in communication with service network 101. Mobile device 102 may communicate with service network 101 using various wireless protocols, such as wireless fidelity, Code Division Multiple Access (CDMA), Global System for Mobile communications (GSM), WiMAX, Long Term Evolution (LTE), Internet, telephony, or some other communication format—including combinations thereof.

Service network 101 may comprise any network that provides communication connectivity for mobile device 102 to send and receive data. Service network 101 may comprise wireless communication nodes, telephony switches, internet routers, network gateways, computer systems, communication links, or some other type of communication equipment—including combinations thereof. Wireless network protocols that may be utilized by service network 101 may comprise CDMA 1 times Radio Transmission Technology (CDMA 1xRTT), GSM, Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), WiMAX, or any other wireless network protocol that facilitates communication between service network 101 and mobile device 102.

Service network 101 is in communication with communication network 103. Service network 101 communicates with communication network 103 using metal, glass, optical fiber, air, or some other material as the transport media. The communication link between service network 101 and communication network 103 may be a direct link or may include various intermediate communication nodes, systems, or networks.

Communication network 103 comprises any network capable of providing a communication service to service 104. For example, communication network 103 could comprise a packet-switched network, such as the Internet, a cellular network, a public switched telephone network (PSTN), an asynchronous transfer mode (ATM) network, a personal communication service (PCS) network, a local area network (LAN), a wide area network (WAN), or any other network that provides a communication service. Moreover, communication network 103 could comprise any of the public switched data networks (PSDNs) such as an Internet Protocol network (Internet), Frame Relay, General Packet Radio Service (GPRS), Ethernet, and others.

Authentication system 106 comprises hardware, software, and circuitry capable of assisting in the authentication of a user of mobile device 102 for service 104. For example, authentication system 106 may receive a service request from mobile device 102, transfer an identification request to identification system 108, receive a device identifier associated with mobile device 102 from identification system 108, determine a user identifier associated with service 104 based on the device identifier, encrypt an authentication assertion comprising the user identifier, and transfer the authentication assertion to mobile device 102. In one embodiment, authentication system 106 encrypts the authentication assertion using a private key, as used in public/private key cryptography. While FIG. 1 shows authentication system 106 connected to service network 101, authentication system 106 could be connected to communication network 103.

Authentication system 106 comprises a communication interface and a processing system. The processing system includes a storage system. The storage system stores software. The processing system is linked to the communication interface. Authentication system 106 could be comprised of a programmed general-purpose computer, although those skilled in the art will appreciate that programmable or special purpose circuitry and equipment may be used. Authentication system 106 may be distributed among multiple devices.

The communication interface could comprise a network interface, modem, port, transceiver, or some other communication device. The processing system could comprise a computer microprocessor, logic circuit, or some other processing device. The storage system could comprise a disk, tape, integrated circuit, server, or some other memory device.

The processing system retrieves and executes the software from the storage system. The software may comprise an operating system, utilities, drivers, networking software, and other software typically loaded onto a computer system. The software could comprise an application program, firmware, or some other form of machine-readable processing instructions. When executed by the processing system, the software directs authentication system 106 to operate as described herein.

Identification system 108 comprises hardware, software, and circuitry capable of transferring a packet address to mobile device 102, and capable of transferring a device identifier that identifies mobile device 102. For example, identification system 108 may receive a registration request from mobile device 102 comprising a device identifier that identifies mobile device 102, transfer a packet address to the mobile device, receive an identification request from authentication system 106, determine a device identifier associated with the packet address indicated in the identification request, and transfer the device identifier to authentication system 106.

Identification system 108 comprises a communication interface and a processing system. The processing system includes a storage system. The storage system stores software. The processing system is linked to the communication interface. Identification system 108 could be comprised of a programmed general-purpose computer, although those skilled in the art will appreciate that programmable or special purpose circuitry and equipment may be used. Identification system 108 may be distributed among multiple devices.

The communication interface could comprise a network interface, modem, port, transceiver, or some other communication device. The processing system could comprise a computer microprocessor, logic circuit, or some other processing device. The storage system could comprise a disk, tape, integrated circuit, server, or some other memory device.

The processing system retrieves and executes the software from the storage system. The software may comprise an operating system, utilities, drivers, networking software, and other software typically loaded onto a computer system. The software could comprise an application program, firmware, or some other form of machine-readable processing instructions. When executed by the processing system, the software directs identification system 108 to operate as described herein.

Service 104 comprises any entity that requires a user to provide identity authentication prior to allowing the user to access service 104. For example, service 104 may comprise a website with an authentication component that accepts and verifies a user's identity. Service 104 may decrypt an authentication assertion provided by authentication system 106. In one embodiment, service 104 decrypts an authentication assertion using a public key, as used in public/private key cryptography. Service 104 may verify the contents of the decrypted authentication assertion to authenticate a user of the mobile device requesting access to service 104. In one embodiment, the decrypted authentication assertion comprises a user identifier that uniquely identifies the user requesting access to service 104.

Service 104 comprises a communication interface and a processing system. The processing system includes a storage system. The storage system stores software. The processing system is linked to the communication interface. Service 104 could be comprised of a programmed general-purpose computer, although those skilled in the art will appreciate that programmable or special purpose circuitry and equipment may be used. Service 104 may be distributed among multiple devices.

The communication interface could comprise a network interface, modem, port, transceiver, or some other communication device. The processing system could comprise a computer microprocessor, logic circuit, or some other processing device. The storage system could comprise a disk, tape, integrated circuit, server, or some other memory device.

The processing system retrieves and executes the software from the storage system. The software may comprise an operating system, utilities, drivers, networking software, and other software typically loaded onto a computer system. The software could comprise an application program, firmware, or some other form of machine-readable processing instructions. When executed by the processing system, the software directs service 104 to operate as described herein.

It will be understood that the foregoing communication system 100 is illustrative only, and that many other arrangements of equipment, components, and interfaces can be used in lieu of those described above or may be omitted in their entirety. Those skilled in the art will understand and appreciate that much of the foregoing descriptions herein are functional in nature and may be implemented as hardware, firmware, or software as individual apparatus or in conjunction with other components, in any suitable combination, manner, and location.

Figure 2:
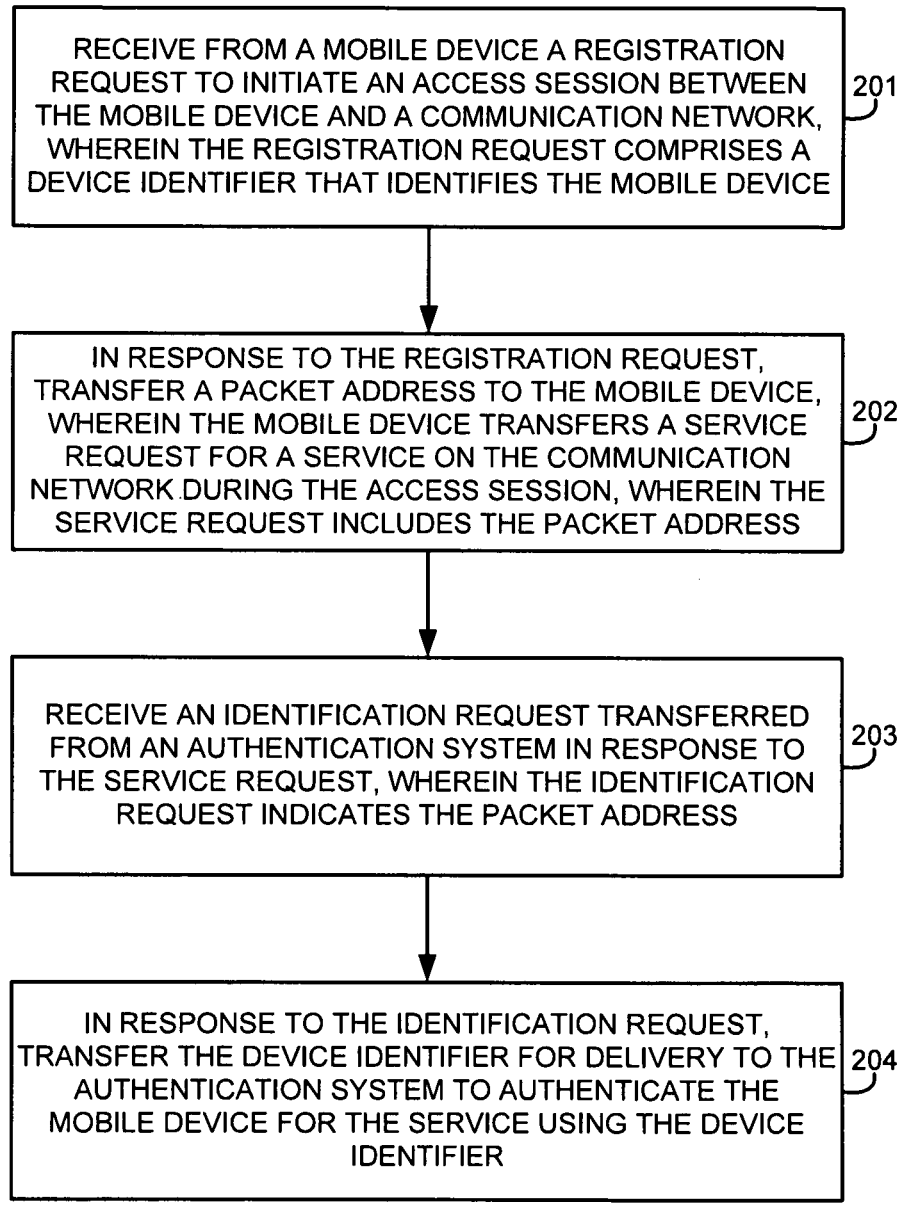
FIG. 2 is a flow diagram that illustrates a method of operating the communication system.

FIG. 2 is a flow diagram that illustrates a method of operating communication system 100. The steps of the operation are shown parenthetically. The method begins with identification system 108 receiving from mobile device 102 a registration request to initiate an access session between mobile device 102 and communication network 103, wherein the registration request comprises a device identifier that identifies mobile device 102 (201). The access session between mobile device 102 and communication network 103 comprises authenticating a user of mobile device 102 for access to service 104 on communication network 103. The device identifier that identifies mobile device 102 may comprise an Electronic Serial Number (ESN), Mobile Station Identifier (MSID), Mobile Equipment Identifier (MEID), International Mobile Equipment Identity (IMEI), User Identity Module Identifier (UIMI), or some other identifier that identifies mobile device 102.

In response to the registration request, identification system 108 transfers a packet address to mobile device 102, wherein mobile device 102 transfers a service request for service 104 on communication network 103 during the access session, wherein the service request includes the packet address (202). The packet address may comprise an Internet Protocol (IP) address, or any other packet address that facilitates communication between mobile device 102 and service network 101. In one embodiment, service 104, in response to the service request, transfers an authentication request for the service to mobile device 102, mobile device 102 transfers the service request to authentication system 106, and, in response to the service request, authentication system 106 transfers an identification request to identification system 108, wherein the identification request indicates the packet address.

In one example, the authentication request transferred to mobile device 102 from service 104 may comprise a service identifier. The service identifier comprises the identity of service 104 and may also comprise appropriate cryptographic certificates asserting this identity. For example, the service identifier could comprise the service's domain name, or credentials proving the service's identity, such as a signed public key certificate. Based on the service identifier received in the authentication request, mobile device 102 may verify that the authentication request was received from a trusted service. Additionally or alternatively, mobile device 102 may include the service identifier in the service request transferred to authentication system 106, thereby enabling authentication system 106 to verify that the authentication request was received from a trusted service.

Identification system 108 receives an identification request transferred from authentication system 106 in response to the service request, wherein the identification request indicates the packet address (203). In response to the identification request, identification system 108 transfers the device identifier that identifies mobile device 102 for delivery to authentication system 108 to authenticate mobile device 102 for service 104 using the device identifier (204).

In one example, identification system 108 transfers the device identifier to authentication system 106. Authentication system 106 then determines a user identifier associated with service 104 based on the device identifier, encrypts an authentication assertion comprising the user identifier, and transfers the authentication assertion to mobile device 102. Mobile device 102 then transfers the authentication assertion to service 104 over communication network 103. Service 104 then decrypts the authentication assertion to recover the user identifier, and verifies the user identifier to authenticate a user of mobile device 102 requesting access to service 104.

Service 104 may use the method of FIG. 2 as the sole means of authenticating a user for access to service 104, or service 104 may use the method of FIG. 2 in conjunction with other authentication systems in a multi-factor authentication scheme. For example, service 104 may use the method of FIG. 2 in conjunction with common methods of authenticating users to a service, such as a shared secret or password between the user and service 104.

In one embodiment, in addition to the user identifier, authentication system 106 may send extended registration information to service 104 within the authentication assertion. For example, authentication system 106 may send the user's name, verified billing address, mobile phone number, or email address to service 104. Service 104 may use the additional information as part of its authentication or authorization decisions, and regulate access to services based on their values. For privacy concerns, authentication system 106 should only release such private user information to service 104 with the user's consent. In this case, authentication system 106 maintains a list of services authorized by the user to receive such information.

In another embodiment, authentication system 106 may obtain the location of mobile device 102 from a location determination system, such as a cellular network's Mobile Positioning Center (MPC) server. Authentication system 106 may acquire a mobility profile comprising a history of previous locations of mobile device 102. Utilizing the mobility profile, authentication system 106 may identify anomalous authentication attempts and inform service 104 of the anomaly. Additionally or alternatively, authentication system 106 may send the location of mobile device 102 to service 104, and service 104 could detect anomalous authentication attempts. When an anomalous authentication attempt occurs, service 104 could require additional authentication from the user, such as requiring the user enter a shared secret or password.

Figure 3:
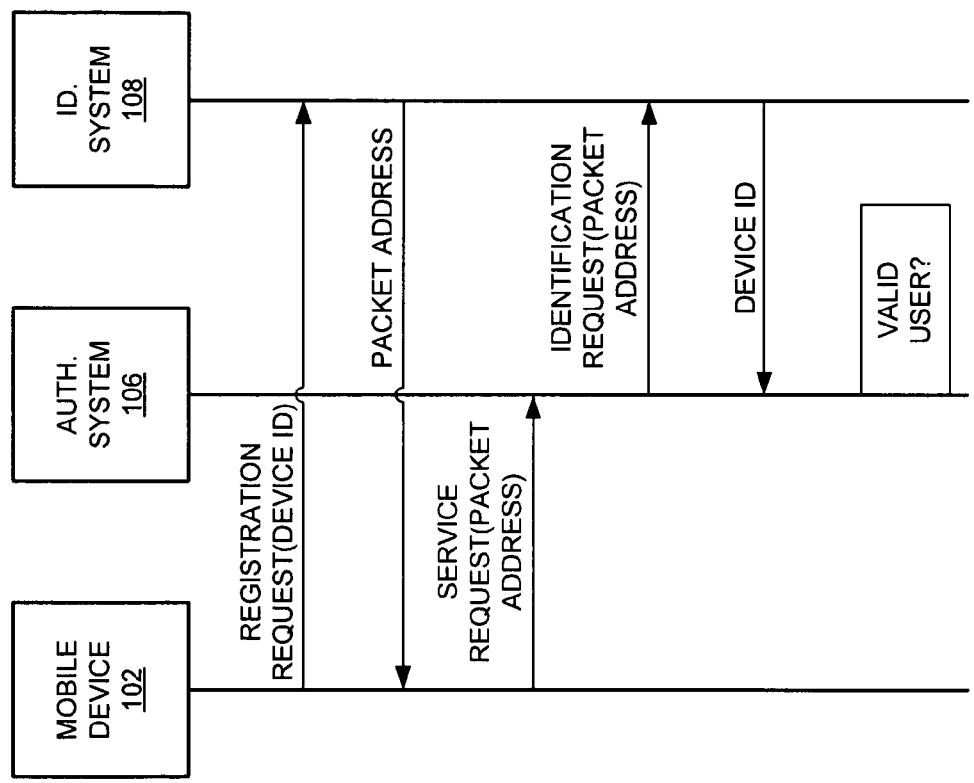
FIG. 3 is a sequence diagram that illustrates an operation of a communication system.

FIG. 3 is a sequence diagram that illustrates an operation of communication system 100. Mobile device 102 transfers a registration request to identification system 108. The registration request comprises a device identifier that identifies mobile device 102. The registration request could occur, for example, when a user of mobile device 102 first turns on or activates mobile device 102, and mobile device 102 registers with service network 101.

In response to the registration request, identification system 108 transfers a packet address to mobile device 102. The packet address may be used by mobile device 102 to access communication network 103 and service 104. Mobile device 102 transfers a service request to authentication system 106. The service request includes the packet address.

In response to the service request, authentication system 106 transfers an identification request to identification system 108. The identification request indicates the packet address. In response to the identification request, identification system 108 transfers the device identifier that identifies mobile device 102 to authentication system 106. Authentication system 106 then authenticates the user of mobile device 102 for service 104 using the device identifier.

In one example, authentication system 106 authenticates the user of mobile device 102 for service 104 using the device identifier by determining a user identifier associated with service 104 based on the device identifier. Authentication system 106 then encrypts an authentication assertion comprising the user identifier, and transfers the authentication assertion to mobile device 102. Mobile device 102 then transfers the authentication assertion to service 104 over communication network 103. Service 104 then decrypts the authentication assertion to recover the user identifier, and verifies the user identifier to authenticate a user of mobile device 102 requesting access to service 104.

Figure 4A:
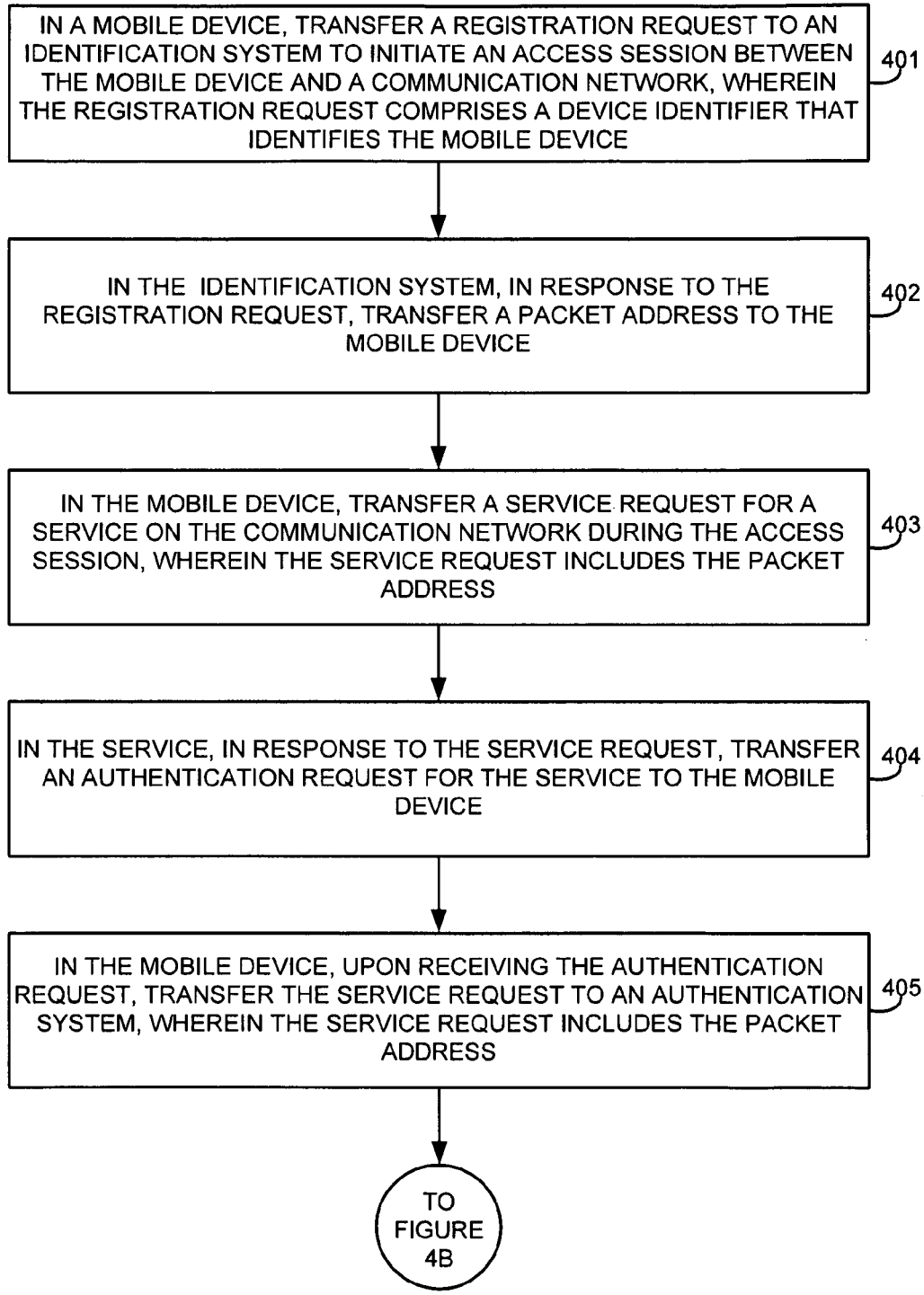
FIG. 4A is a flow diagram that illustrates a method of operating the communication system.

FIG. 4A is a flow diagram that illustrates a method of operating communication system 100. The steps of the operation are shown parenthetically. The method begins with mobile device 102 transferring a registration request to identification system 108 to initiate an access session between mobile device 102 and communication network 103, wherein the registration request comprises a device identifier that identifies mobile device 102 (401). The access session between mobile device 102 and communication network 103 comprises authenticating a user of mobile device 102 for access to service 104 on communication network 103. The device identifier that identifies mobile device 102 may comprise an Electronic Serial Number (ESN), Mobile Station Identifier (MSID), Mobile Equipment Identifier (MEID), International Mobile Equipment Identity (IMEI), User Identity Module Identifier (UIMI), or some other identifier that identifies mobile device 102.

In response to the registration request, identification system 108 transfers a packet address to mobile device 102 (402). The packet address may comprise an Internet Protocol (IP) address, or any other packet address that facilitates communication between mobile device 102 and service network 101.

Mobile device 102 transfers a service request for service 104 on communication network 103 during the access session, wherein the service request includes the packet address (403). In response to the service request, service 104 transfers an authentication request for the service to mobile device 102 (404). Service 104 transfers the authentication request to mobile device 102 to require a user of mobile device 102 to provide identity authentication prior to allowing the user access to service 104. In one example, the authentication request transferred to mobile device 102 from service 104 may comprise a service identifier. The service identifier comprises the identity of service 104 and may also comprise appropriate cryptographic certificates asserting this identity. For example, the service identifier could comprise the service's domain name, or credentials proving the service's identity, such as a signed public key certificate. Based on the service identifier received in the authentication request, mobile device 102 may verify that the authentication request was received from a trusted service.

Upon receiving the authentication request, mobile device 102 transfers the service request to authentication system 106, wherein the service request includes the packet address (405). In one example, the service request may comprise the service identifier received by mobile device 102 from service 104 in the authentication request, thereby enabling authentication system 106 to verify that the authentication request was received from a trusted service. The operation then proceeds to the steps presented in FIG. 4B.

Figure 4B:
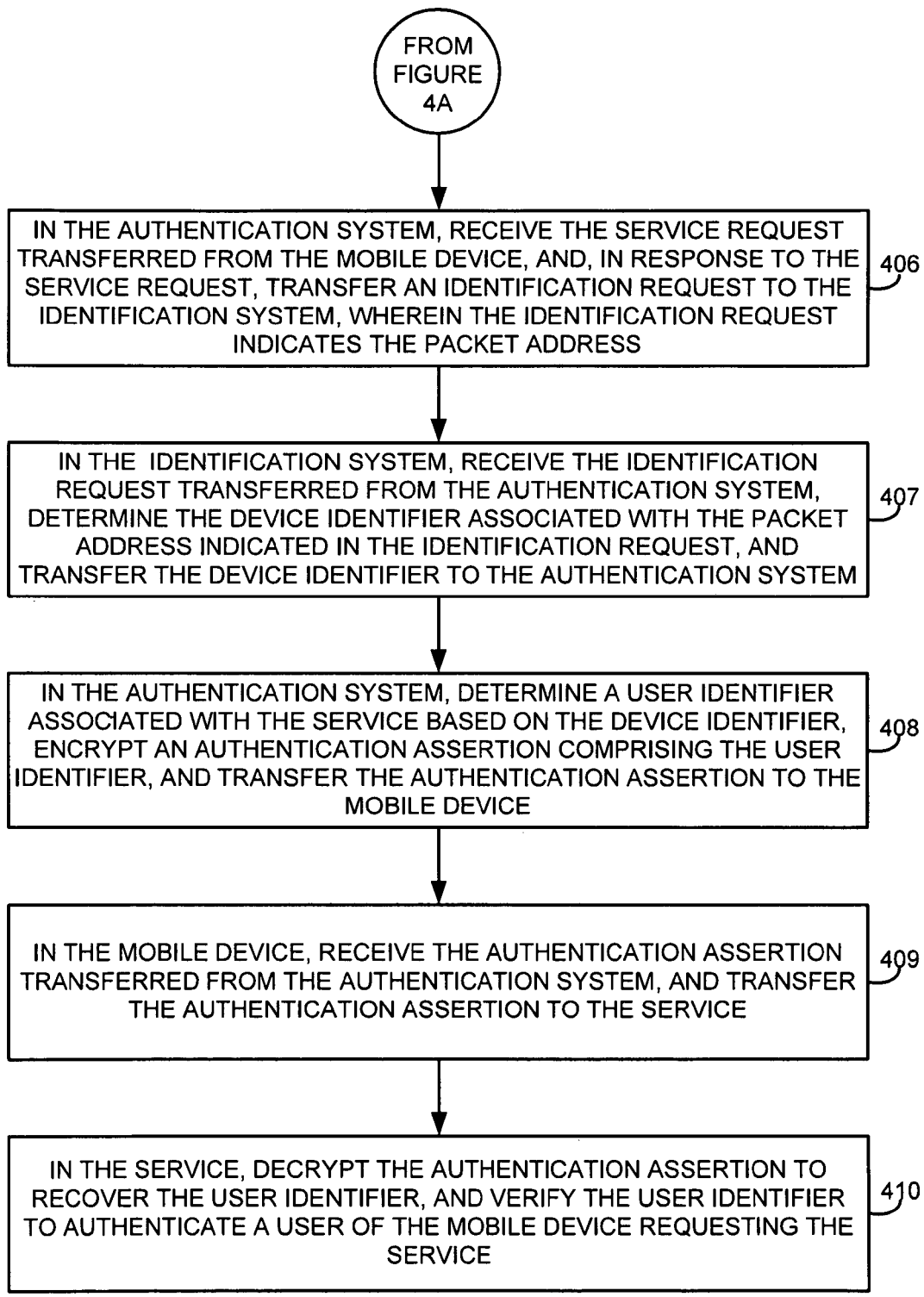
FIG. 4B is a continuation of the flow diagram of FIG. 4A that illustrates a method of operating the communication system.

FIG. 4B is a continuation of the flow diagram of FIG. 4A that illustrates a method of operating communication system 100. Authentication system 106 receives the service request transferred from mobile device 102 in operation 405 of FIG. 4A (406). In one example, authentication system 106 may verify a service key included in the request in order to verify that the service request originated from a valid service. A valid service is one that is known and trusted by authentication system 106. Verifying the service key eliminates the possibility of a rogue service posing as the actual service attempting to trick a user into incorrectly authenticating to it.

In response to the service request, authentication system 106 transfers an identification request to identification system 108, where the identification request indicates the packet address (406). Identification system 108 receives the identification request from authentication system 106, determines the device identifier associated with the packet address indicated in the identification request, and transfers the device identifier to authentication system 106 (407). In one example, if identification system 108 cannot determine a device identifier associated with the packet address indicated in the identification request, identification system 108 notifies authentication system 108 that the packet address cannot be identified.

If identification system 108 successfully determines the device identifier associated with the packet address, identification system 108 transfers the device identifier to authentication system 106 in operation 407. Authentication system 106 determines a user identifier associated with service 104 based on the device identifier, encrypts an authentication assertion comprising the user identifier, and transfers the authentication assertion to mobile device 102 (408). In one example, the user identifier comprises the device identifier. In operation 408, authentication system 106 transfers the authentication assertion to mobile device 102 in order to verify that the packet address provided by mobile device 102 in the service request during operation 405 is actually assigned to mobile device 102. If mobile device 102 has not been assigned the packet address specified in the service request sent to authentication system 106 in operation 405, mobile device 102 will not receive the authentication assertion from authentication system 106 in operation 408. In one embodiment, authentication system 106 encrypts the authentication assertion using a private key, as used in public/private key cryptography.

Mobile device 102 receives the authentication assertion transferred from authentication system 106, and transfers the authentication assertion to service 104 over communication network 103 (409). Service 104 then decrypts the authentication assertion to recover the user identifier, and verifies the user identifier to authenticate a user of mobile device 102 requesting access to service 104 (410). In one embodiment, the authentication assertion has been digitally signed by authentication system 106 using a private key, so service 104 can verify that the authentication assertion has come from a trusted source. For example, service 104 may decrypt the authentication assertion using a public key, as used in public/private key cryptography. Service 104 may verify the user identifier by matching the user identifier with one of a plurality of user identifiers associated with known users of service 104. The user identifier may comprise a username, user number, or some other identifier that identifies the user authorized to access service 104.

Service 104 may use the method of FIGS. 4A and 4B as the sole means of authenticating a user for access to service 104, or service 104 may use the method of FIGS. 4A and 4B in conjunction with other authentication systems in a multifactor authentication scheme. For example, service 104 may use the method of FIGS. 4A and 4B in conjunction with common methods of authenticating users to a service, such as a shared secret or password between the user and service 104.

In one embodiment, in addition to the user identifier, authentication system 106 may send extended registration information to service 104 within the authentication assertion. For example, authentication system 106 may send the user's name, verified billing address, mobile phone number, or email address to service 104. Service 104 may use the additional information as part of its authentication or authorization decisions, and regulate access to services based on their values. To ensure the user's privacy, authentication system 106 should only release such private user information to service 104 with the user's consent. In this case, authentication system 106 maintains a list of services authorized by the user to receive such information.

In addition, authentication system 106 may obtain the location of mobile device 102 from a location determination system, such as a cellular network's Mobile Positioning Center (MPC) server. Authentication system 106 may acquire a mobility profile comprising a history of previous locations of mobile device 102. Utilizing the mobility profile, authentication system 106 may identify anomalous authentication attempts and inform service 104 of the anomaly. Alternatively, authentication system 106 may send the location of mobile device 102 to service 104, and service 104 could detect anomalous authentication attempts. When an anomalous authentication attempt occurs, service 104 could require additional authentication from the user, such as requiring the user enter a shared secret or password.

Mobile device 102 may interface with service 104 in a variety of ways. In one example, mobile device 102 may directly access the Internet, and communicate with service 104 from a web browser directly on mobile device 102. In another example, a user of mobile device 102 may use a personal computer with cellular data services to interface with service 104, for example, by using a cellular data card. In another example, a user of mobile device 102 may use a personal computer capable of initiating a connection with mobile device 102, for example by using Bluetooth, Universal Serial Bus (USB), or infrared (IR) technologies. In this example, the personal computer may use a cellular network just for handling authentication, and use a non-cellular Internet connection for all other web traffic. In another example, a user of mobile device 102 accesses service 104 using a personal computer not connected to mobile device 102. In this example, the user assists the authentication process by copying a single string from mobile device 102 into a web browser displaying an authentication prompt of service 104.

Figure 5:
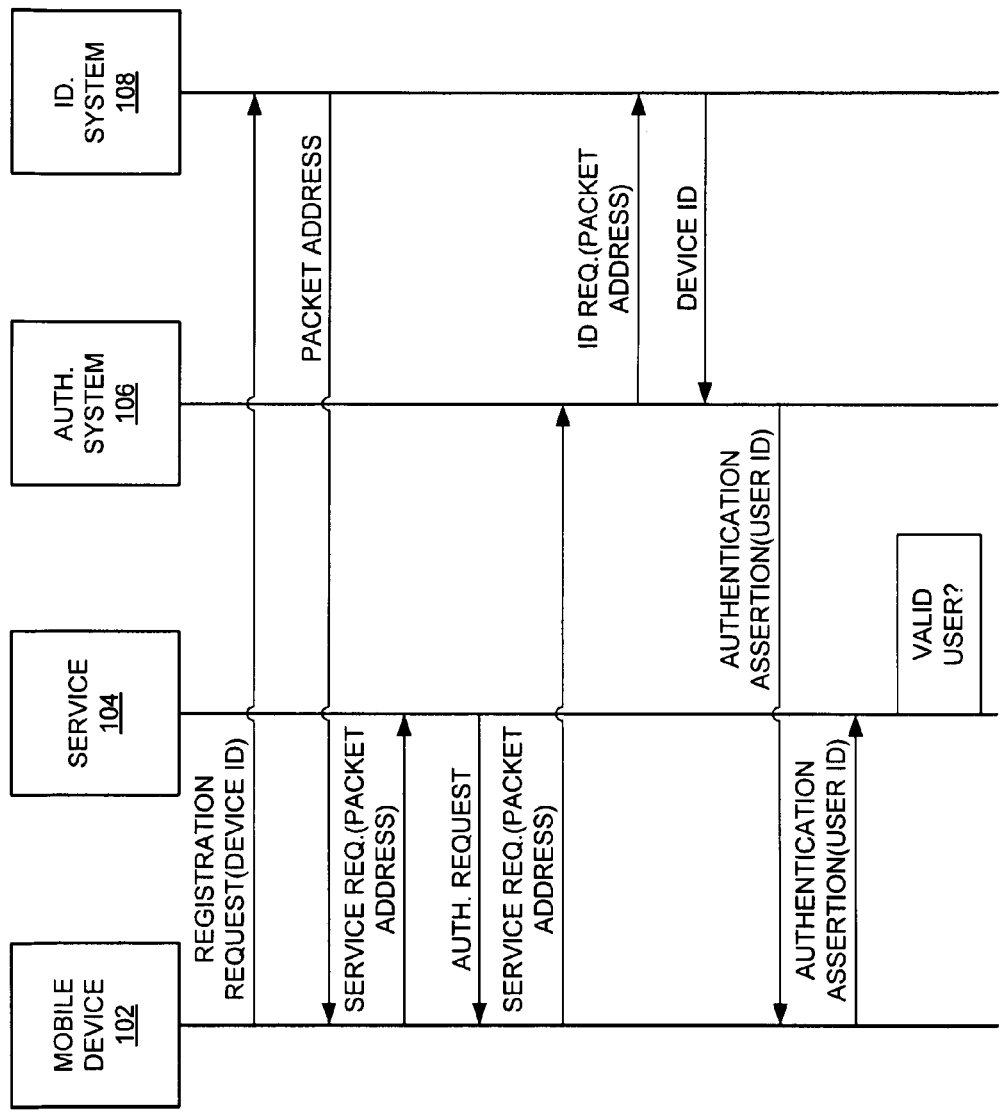
FIG. 5 is a sequence diagram that illustrates an operation of a communication system.

FIG. 5 is a sequence diagram that illustrates an operation of communication system 100. The operation begins with mobile device 102 transferring a registration request to identification system 108. The registration request comprises a device identifier that identifies mobile device 102. The device identifier that identifies mobile device 102 may comprise an Electronic Serial Number (ESN), Mobile Station Identifier (MSID), Mobile Equipment Identifier (MEID), International Mobile Equipment Identity (IMEI), User Identity Module Identifier (UIMI), or some other identifier that identifies mobile device 102.

In response to the registration request, identification system 108 transfers a packet address to mobile device 102. The packet address may comprise an Internet Protocol (IP) address, or any other packet address that facilitates communication between mobile device 102 and service network 101.

Mobile device 102 transfers a service request to service 104. The service request comprises a request to access service 104 and includes the packet address. In response to the service request, service 104 transfers an authentication request for the service to mobile device 102. Service 104 transfers the authentication request to mobile device 102 to require a user of mobile device 102 to provide identity authentication prior to allowing the user access to service 104. Upon receiving the authentication request, mobile device 102 transfers the service request to authentication system 106. The service request includes the packet address.

Authentication system 106 receives the service request transferred from mobile device 102. In response to the service request, authentication system 106 transfers an identification request to identification system 108. The identification request includes the packet address. Identification system 108 receives the identification request from authentication system 106, determines the device identifier associated with the packet address indicated in the identification request, and transfers the device identifier to authentication system 106.

Authentication system 106 receives the device identifier from identification system 108. Authentication system 106 determines a user identifier associated with service 104 based on the device identifier, and encrypts an authentication assertion comprising the user identifier. In one embodiment, authentication system 106 encrypts the authentication assertion using a private key, as used in public/private key cryptography. Once authentication system 106 generates the authentication assertion, authentication system 106 transfers the authentication assertion to mobile device 102.

Mobile device 102 receives the authentication assertion transferred from authentication system 106, and transfers the authentication assertion to service 104 over communication network 103. Service 104 then decrypts the authentication assertion to recover the user identifier, and verifies the user identifier to authenticate a user of mobile device 102 requesting access to service 104. In one embodiment, the authentication assertion has been digitally signed by authentication system 106 using a private key, so service 104 can verify that the authentication assertion has come from a trusted source. For example, service 104 may decrypt the authentication assertion using a public key, as used in public/private key cryptography. Service 104 may verify the user identifier by matching the user identifier with one of a plurality of user identifiers associated with known users of service 104. The user identifier may comprise a username, user number, or some other identifier that identifies the user authorized to access service 104.

Figure 6:
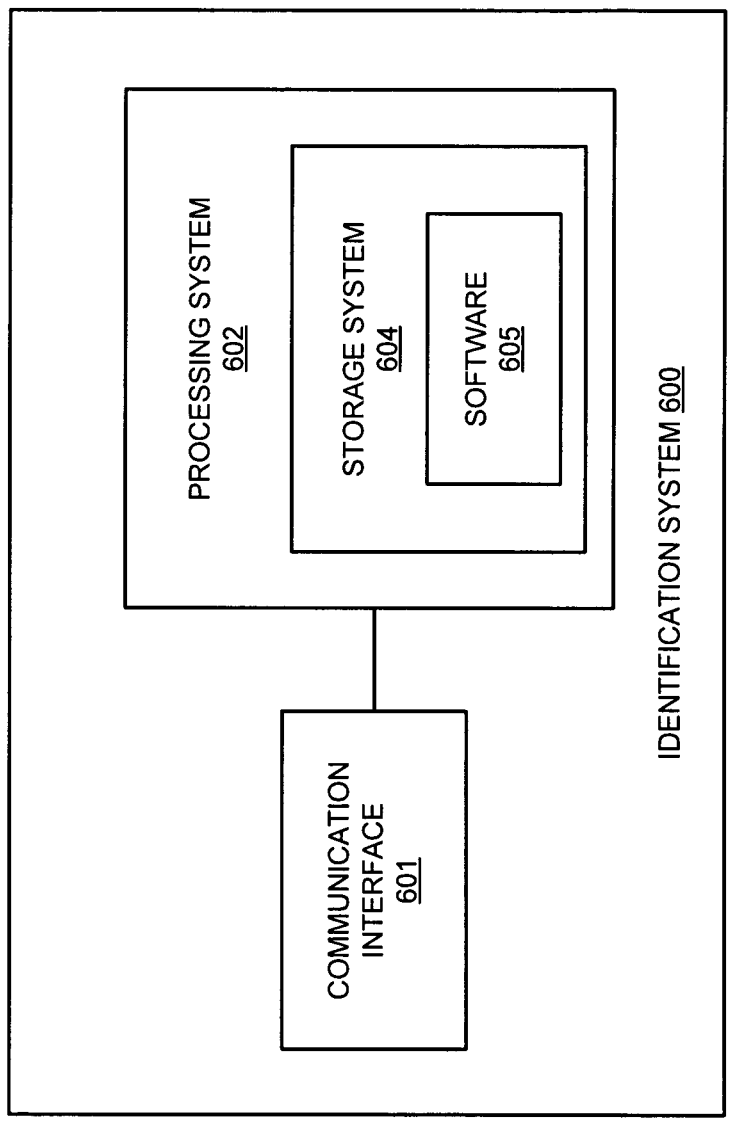
FIG. 6 is a block diagram that illustrates an identification system.

FIG. 6 is a block diagram that illustrates identification system 600. Identification system 600 provides an example of mode identification system 108, although system 108 may use other configurations. Identification system 600 includes communication interface 601 and processing system 602. Processing system 602 includes storage system 604. Storage system 604 stores software 605. Processing system 602 is linked to communication interface 601. Identification system 600 could be comprised of a programmed general-purpose computer, although those skilled in the art will appreciate that programmable or special purpose circuitry and equipment may be used. Identification system 600 may be distributed among multiple devices that together comprise elements 601-605.

Communication interface 601 could comprise a network interface, modem, port, transceiver, or some other communication device. Communication interface 601 may be distributed among multiple communication devices. Processing system 602 could comprise a computer microprocessor, logic circuit, or some other processing device. Processing system 602 may be distributed among multiple processing devices. Storage system 604 could comprise a disk, tape, integrated circuit, server, or some other memory device. Storage system 604 may be distributed among multiple memory devices.

Processing system 602 retrieves and executes software 605 from storage system 604. Software 605 may comprise an operating system, utilities, drivers, networking software, and other software typically loaded onto a computer system. Software 605 could comprise an application program, firmware, or some other form of machine-readable processing instructions.

When executed by processing system 602, software 605 directs processing system 602 to operate identification system 600 as described herein. In particular, communication interface 601 receives from a mobile device a registration request to initiate an access session between the mobile device and a communication network, wherein the registration request comprises a device identifier that identifies the mobile device. In response to the registration request, communication interface 601 transfers a packet address to the mobile device, wherein the mobile device transfers a service request for a service on the communication network during the access session, wherein the service request includes the packet address. Communication interface 601 receives an identification request transferred from an authentication system in response to the service request, wherein the identification request indicates the packet address. In response to the identification request, communication interface 601 transfers the device identifier for delivery to the authentication system to authenticate the mobile device for the service using the device identifier.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an identification system, the method comprising:
    receiving from a mobile device a registration request to initiate an access session between the mobile device and a communication network, wherein the registration request comprises a device identifier that identifies the mobile device;
    in response to the registration request, transferring a packet address to the mobile device, wherein the mobile device transfers a service request for a service on the communication network during the access session, wherein the service request includes the packet address;
    receiving an identification request transferred from an authentication system in response to the service request, wherein the identification request indicates the packet address;
    in response to the identification request, transferring the device identifier for delivery to the authentication system to authenticate the mobile device for the service using the device identifier.

2. The method of claim 1 wherein the service, in response to receiving the service request for the service from the mobile device during the access session, transfers an authentication request for the service to the mobile device.

3. The method of claim 2 wherein the mobile device, in response to receiving the authentication request, transfers the service request to the authentication system, wherein the service request includes the packet address.

4. The method of claim 1 wherein the authentication system, to authenticate the mobile device for the service using the device identifier, determines a user identifier associated with the service based on the device identifier, encrypts an authentication assertion comprising the user identifier, and transfers the authentication assertion to the mobile device.

5. The method of claim 4 wherein the authentication system encrypts the authentication assertion using a private key.

6. The method of claim 4 wherein the mobile device, in response to receiving the authentication assertion, transfers the authentication assertion to the service, and wherein the service decrypts the authentication assertion to recover the user identifier and verifies the user identifier to authenticate the user of the mobile device requesting the service.

7. The method of claim 6 wherein the service decrypts the authentication assertion using a public key.

8. The method of claim 1 wherein the service comprises a website.

9. An identification system comprising:
    a communication interface configured to receive from a mobile device a registration request to initiate an access session between the mobile device and a communication network, wherein the registration request comprises a device identifier that identifies the mobile device,
    in response to the registration request, the communication interface configured to transfer a packet address to the mobile device, wherein the mobile device transfers a service request for a service on the communication network during the access session, wherein the service request includes the packet address,
    the communication interface configured to receive an identification request transferred from an authentication system in response to the service request, wherein the identification request indicates the packet address, and
    in response to the identification request, the communication interface configured to transfer the device identifier for delivery to the authentication system to authenticate the mobile device for the service using the device identifier.

10. The system of claim 9 wherein the service, in response to receiving the service request for the service from the mobile device during the access session, transfers an authentication request for the service to the mobile device.

11. The system of claim 9 wherein the mobile device, in response to receiving the authentication request, transfers the service request to the authentication system, wherein the service request includes the packet address.

12. The system of claim 9 wherein the authentication system, to authenticate the mobile device for the service using the device identifier, determines a user identifier associated with the service based on the device identifier, encrypts an authentication assertion comprising the user identifier, and transfers the authentication assertion to the mobile device.

13. The system of claim 12 wherein the authentication system encrypts the authentication assertion using a private key.

14. The system of claim 12 wherein the mobile device, in response to receiving the authentication assertion, transfers the authentication assertion to the service, and wherein the service decrypts the authentication assertion to recover the user identifier and verifies the user identifier to authenticate the user of the mobile device requesting the service.

15. The system of claim 14 wherein the service decrypts the authentication assertion using a public key.

16. The system of claim 9 wherein the service comprises a website.

17. A method of operating a communication system, the method comprising:
    in a mobile device, transferring a registration request to an identification system to initiate an access session between the mobile device and a communication network, wherein the registration request comprises a device identifier that identifies the mobile device;
    in the identification system, in response to the registration request, transferring a packet address to the mobile device;
    in the mobile device, transferring a service request for a service on the communication network during the access session, wherein the service request includes the packet address;
    in the service, in response to the service request, transferring an authentication request for the service to the mobile device;

in the mobile device, upon receiving the authentication request, transferring the service request to an authentication system, wherein the service request includes the packet address;

in the authentication system, receiving the service request transferred from the mobile device, and, in response to the service request, transferring an identification request to the identification system, wherein the identification request indicates the packet address;

in the identification system, receiving the identification request transferred from the authentication system, determining the device identifier associated with the packet address indicated in the identification request, and transferring the device identifier to the authentication system;

in the authentication system, determining a user identifier associated with the service based on the device identifier, encrypting an authentication assertion comprising the user identifier, and transferring the authentication assertion to the mobile device;

in the mobile device, receiving the authentication assertion transferred from the authentication system, and transferring the authentication assertion to the service; and in the service, decrypting the authentication assertion to recover the user identifier, and verifying the user identifier to authenticate a user of the mobile device requesting the service.

18. The method of claim 17 wherein, in the authentication system, encrypting the authentication assertion comprises encrypting the authentication assertion using a private key.

19. The method of claim 17 wherein, in the service, decrypting the authentication assertion to recover the user identifier comprises decrypting the authentication assertion using a public key.

20. The method of claim 17 wherein, in the service, verifying the user identifier to authenticate the user of the mobile device requesting the service comprises verifying the user identifier matches one of a plurality of user identifiers associated with known users of the service.

\* \* \* \* \*